United States Patent
Hirakawa

(10) Patent No.: US 11,329,566 B2
(45) Date of Patent: May 10, 2022

(54) DC POWER SUPPLY CIRCUIT THAT ENHANCES STABILITY OF OUTPUT VOLTAGE

(71) Applicant: HAMAMATSU PHOTONICS K.K., Hamamatsu (JP)

(72) Inventor: Tomohiro Hirakawa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/263,454

(22) PCT Filed: Jun. 12, 2019

(86) PCT No.: PCT/JP2019/023364
§ 371 (c)(1),
(2) Date: Jan. 26, 2021

(87) PCT Pub. No.: WO2020/026601
PCT Pub. Date: Feb. 6, 2020

(65) Prior Publication Data
US 2021/0288583 A1    Sep. 16, 2021

(30) Foreign Application Priority Data
Jul. 30, 2018    (JP) .............................. JP2018-142588

(51) Int. Cl.
*H02M 3/335* (2006.01)
*H02M 1/00* (2006.01)
(Continued)

(52) U.S. Cl.
CPC ..... *H02M 3/33523* (2013.01); *H02M 1/0025* (2021.05); *H02M 1/0045* (2021.05); *H02M 3/07* (2013.01); *H02M 7/5395* (2013.01)

(58) Field of Classification Search
CPC .......... H02M 3/33523; H02M 1/0025; H02M 1/0045; H02M 3/07; H02M 7/5395
See application file for complete search history.

(56) References Cited

U.S. PATENT DOCUMENTS 4,499,531 A * 2/1985 Bray ................... H02M 3/3385
363/19
4,686,617 A * 8/1987 Colton .............. H02M 3/33523
361/93.9
(Continued)

FOREIGN PATENT DOCUMENTS

| JP | H05-064439 A | 3/1993 |
| JP | H06-022550 A | 1/1994 |
| JP | 2008-148471 A | 6/2008 |

OTHER PUBLICATIONS

International Preliminary Report on Patentability dated Feb. 11, 2021 for PCT/JP2019/023364.

*Primary Examiner* — Yusef A Ahmed
(74) *Attorney, Agent, or Firm* — Faegre Drinker Biddle & Reath LLP

(57) ABSTRACT

A DC power supply circuit includes a voltage regulator circuit, a transformer including a primary winding, a transistor connected to the primary winding and alternately repeating switching on and off of a current, a rectifier circuit connected to a secondary winding and converting a voltage output from the secondary winding into a DC voltage, and a control circuit for controlling an on/off duty ratio of the transistor according to a target voltage. When the target voltage is included in a first voltage range, the control circuit sets the duty ratio to be constant, and a transistor of the regulator circuit operates in a linear region. When the target voltage is included in a second voltage range higher than the (Continued)

first voltage range, the control circuit changes the duty ratio according to the target voltage, and the transistor operates in a saturation region.

3 Claims, 13 Drawing Sheets

(51) Int. Cl.
*H02M 7/5395* (2006.01)
*H02M 3/07* (2006.01)

(56) References Cited

U.S. PATENT DOCUMENTS

| | | | | |
|---|---|---|---|---|
| 4,761,702 A * | 8/1988 | Pinard | ........... | H02H 7/1213 |
| | | | | 361/18 |
| 4,964,028 A * | 10/1990 | Spataro | ........... | H02M 3/33507 |
| | | | | 363/56.1 |
| 5,077,486 A * | 12/1991 | Marson | ........... | H02M 3/33592 |
| | | | | 205/728 |
| 6,188,276 B1 * | 2/2001 | Simopoulos | ...... | H02M 3/33576 |
| | | | | 330/10 |
| 6,456,511 B1 * | 9/2002 | Wong | ........... | H02M 3/33523 |
| | | | | 363/21.13 |
| 6,707,283 B1 * | 3/2004 | Ball | ........... | H02M 3/33507 |
| | | | | 323/284 |
| 7,167,089 B2 * | 1/2007 | Chen | ........... | B60R 25/1018 |
| | | | | 340/426.1 |
| RE41,061 E * | 12/2009 | Zinn | ........... | H02M 3/158 |
| | | | | 323/266 |
| 8,971,062 B2 * | 3/2015 | Huang | ........... | H02M 3/33523 |
| | | | | 363/21.16 |
| 9,093,910 B1 * | 7/2015 | Ankamreddi | ..... | H02M 3/33523 |
| 9,847,710 B2 * | 12/2017 | Lee | ........... | H02M 1/4258 |
| 10,170,973 B1 * | 1/2019 | Hirose | ........... | H02M 7/217 |
| 10,170,989 B2 * | 1/2019 | Balteanu | ........... | G05F 1/56 |
| 2002/0121882 A1 * | 9/2002 | Matsuo | ........... | G05F 1/565 |
| | | | | 323/266 |
| 2005/0157522 A1 * | 7/2005 | Osaka | ........... | H02M 3/33569 |
| | | | | 363/21.02 |
| 2009/0141520 A1 * | 6/2009 | Grande | ........... | H02M 3/33523 |
| | | | | 363/21.16 |
| 2009/0261790 A1 * | 10/2009 | Arduini | ........... | H02M 3/33592 |
| | | | | 323/266 |
| 2011/0026278 A1 * | 2/2011 | Yin | ........... | H02M 3/3385 |
| | | | | 363/21.15 |
| 2014/0160803 A1 * | 6/2014 | Sato | ........... | H02M 3/33507 |
| | | | | 363/21.01 |
| 2014/0160804 A1 * | 6/2014 | Sato | ........... | H02M 3/33507 |
| | | | | 363/21.01 |
| 2014/0300274 A1 * | 10/2014 | Acatrinei | ........... | H05B 45/382 |
| | | | | 315/85 |
| 2015/0023070 A1 * | 1/2015 | Nate | ........... | H02M 3/33507 |
| | | | | 363/21.17 |
| 2019/0013737 A1 * | 1/2019 | Lin | ........... | H02M 3/33523 |

* cited by examiner

DC POWER SUPPLY CIRCUIT THAT ENHANCES STABILITY OF OUTPUT VOLTAGE

TECHNICAL FIELD

The present disclosure relates to a DC power supply circuit.

BACKGROUND ART

Patent Document 1 discloses a technique related to a high-voltage power supply control circuit. FIG. 12 is a diagram illustrating a circuit disclosed in this document. As illustrated in FIG. 12, the circuit 100 includes a DC input terminal 101, a switching regulator 102, a PWM control circuit 103, an inverter circuit 104, a high-voltage transformer 105, a rectifier and smoothing circuit 106, an output voltage detection circuit 107, a series dropper 108, an output terminal 109, a drop voltage detection circuit 110, and a switch circuit 111.

The PWM control circuit 103 controls a duty width of a driving pulse of the switching regulator 102. The DC voltage input from the DC input terminal 101 is transmitted to a primary side of the high-voltage transformer 105 by the inverter circuit 104 after suppressing the variation by the switching regulator 102. On a secondary side of the high-voltage transformer 105, rectification and smoothing are performed by the rectifier and smoothing circuit 106, and a DC voltage is generated again. This DC voltage is stabilized further by the series dropper 108 controlled by the output voltage detection circuit 107, and is output from the output terminal 109.

Patent Document 2 discloses a technique related to a DC high-voltage power supply device. FIG. 13 is a diagram illustrating a circuit disclosed in this document. As illustrated in FIG. 13, the circuit 200 includes a step-up transformer 201, a transistor 202, a PWM control circuit 203, a voltage multiplier rectifier circuit 204, a limiting resistor 205, an output voltage detection circuit 207, an output current detection circuit 208, a soft start circuit 209, a freewheel diode 210, a surge absorber circuit 211, and an inductor 212.

The voltage multiplier rectifier circuit 204 includes diodes 204a and 204b and capacitors 204c and 204d, and is connected to the output terminal 221 via the limiting resistor 205. A DC voltage is applied to a primary winding of the step-up transformer 201. The transistor 202 is connected to the primary winding of the step-up transformer 201 for switching the DC voltage applied to the primary winding on and off. The PWM control circuit 203 for switching the transistor 202 on and off is connected to the base of the transistor 202.

When the voltage applied to the primary winding of the step-up transformer 201 is switched on and off by the transistor 202, a high voltage is generated in the secondary winding of the step-up transformer 201. The high voltage is rectified by the capacitor-input type voltage multiplier rectifier circuit 204, and is output from the output terminal 221 via the limiting resistor 205. The output voltage detection circuit 207 is connected to the output terminal 221. The output current detection circuit 208 is connected to the voltage multiplier rectifier circuit 204.

The PWM control circuit 203 controls on/off timings of the transistor 202 on the basis of a voltage value detected by the output voltage detection circuit 207 and a current value detected by the output current detection circuit 208. Thus, constant voltage control and constant current control are performed. In addition, the soft start circuit 209 is provided to allow the transistor 202 to enter a normal operation while suppressing a peak current by gradually increasing the on-time of the transistor 202 at the time of activating the power supply.

CITATION LIST

Patent Literature

Patent Document 1: Japanese Patent Application Laid-Open Publication No. H5-64439
Patent Document 2: Japanese Patent Application Laid-Open Publication No. H6-22550

SUMMARY OF INVENTION

Technical Problem

In a switching power supply device, an input direct current is switched on and off using a switch element such as an FET to control energy supplied to a primary winding of a transformer. A rectifier circuit is connected to a secondary winding of the transformer for obtaining DC power. For obtaining a high voltage, a method such as increasing the number of secondary windings of the transformer to be larger than the number of primary windings, using a voltage multiplier rectifier circuit such as a Cockcroft-Walton circuit as a rectifier circuit may be used. An output voltage is maintained at a desired magnitude by feedback control. In general, a difference between the output voltage and a target voltage is fed back to the ratio of the on-time and the off-time of the switch element.

In the switching power supply device, the output voltage may be varied. In particular, it is preferable to vary the output voltage when a power supply target requires a high-voltage power supply (a photomultiplier tube, a semiconductor photosensor, or the like). In such a case, it is ideal to obtain a stable voltage value at any output voltage within a variable range, however, in practice, AC components such as ripple noise resulting from switching are superimposed. In particular, when the output voltage value becomes too low, a switching cycle becomes not constant (intermittent oscillation), and AC components appear remarkably. Due to this, the stability of the output voltage decreases. Decrease in stability of the output voltage results in variation in the output signal of the power supply target, which causes a decrease in measurement accuracy.

A low-pass filter may be provided to remove the AC components from the output voltage. However, since the cycle of intermittent oscillation is several times the switching cycle, the component size of the low-pass filter capable of removing AC components having such a cycle increases, and as a result, the entire power supply device becomes excessively large. Further, in the circuit (see FIG. 13) disclosed in Patent Document 2, the inductor 212 is provided to remove AC components, however, the inductance of the inductor 212 must be increased when the current is very small, and as a result, the size of the inductor 212 becomes large, and therefore, the entire power supply device becomes excessively large.

Further, a method of providing a series regulator in front of the switching regulator to control the magnitude of the output voltage using the series regulator while maintaining a constant switching duty ratio may be considered. However, the series regulator has more power loss than the switching regulator. Controlling the magnitude of the output voltage over the entire output voltage range using the series regulator is not desirable since the power loss becomes significantly large.

An object of the present invention is to provide a DC power supply circuit capable of enhancing the stability of an output voltage while suppressing an increase in the size of a power supply device and an increase in the power loss.

Solution to Problem

An embodiment of the present invention is a DC power supply circuit. The DC power supply circuit includes a voltage regulator circuit including a transistor provided in series in a power line, and an amplifier for receiving a control signal corresponding to a target voltage and controlling a voltage applied to a control terminal of the transistor according to the control signal; a transformer including a primary winding connected to the voltage regulator circuit; a switch element connected to the primary winding and for alternately repeating switching on and off of a current flowing through the primary winding; a rectifier circuit connected to a secondary winding of the transformer and for converting a voltage output from the secondary winding into a DC voltage; and a control circuit for controlling an on/off duty ratio of the switch element according to the target voltage, and, when the target voltage is included in a first voltage range, the control circuit sets the duty ratio to be constant, and the transistor operates in a linear region, and when the target voltage is included in a second voltage range higher than the first voltage range, the control circuit changes the duty ratio according to the target voltage, and the transistor operates in a saturation region.

In the above DC power supply circuit, when an electric power having a certain voltage value is input to the power line, an output voltage value is controlled by the transistor with the input voltage value as an upper limit. When the target voltage is included in the relatively low first voltage range, the transistor operates in the linear region, and the output voltage value is changed according to the voltage input to the control terminal of the transistor. Further, when the target voltage is included in the relatively high second voltage range, the output voltage value becomes substantially equal to the input voltage value regardless of the voltage input to the control terminal of the transistor.

The output voltage from the transistor controlled in this manner is input to the primary winding of the transformer. In this case, the switch element alternately repeats switching on and off of the current flowing through the primary winding. The on/off duty ratio is controlled by the control circuit according to the target voltage. That is, when the target voltage is included in the first voltage range, the control circuit sets the duty ratio to be constant. Further, when the target voltage is included in the second voltage range, the control circuit changes the duty ratio according to the target voltage. The voltage generated in the secondary winding of the transformer is converted into the DC voltage by the rectifier circuit, and is output to the outside of the DC power supply circuit.

As described above, when the target voltage is included in the relatively low first voltage range, the control circuit sets the duty ratio to be constant, and the transistor operates in the linear region. That is, in the first voltage range, the series regulator realized by the transistor controls the magnitude of the output voltage, and the switching regulator realized by the switch element and the transformer does not control the magnitude of the output voltage. Thus, it is possible to avoid intermittent oscillation of the switch element and reduce AC components such as ripple noise resulting from switching. Therefore, it is possible to suppress an increase in the size of the power supply device resulting from providing a low-pass filter or the like for coping with intermittent oscillation.

Further, when the target voltage is included in the relatively high second voltage range, the control circuit changes the duty ratio according to the target voltage, and the transistor operates in the saturation region. That is, in the second voltage range, the series regulator realized by the transistor does not control the magnitude of the output voltage, and the switching regulator realized by the switch element and the transformer controls the magnitude of the output voltage. Thus, it is possible to reduce power loss in the series regulator.

From the above, according to the DC power supply circuit having the above configuration, it is possible to enhance the stability of the output voltage while suppressing an increase in the size of a power supply device and an increase in the power loss.

Advantageous Effects of Invention

According to the DC power supply circuit of the embodiment of the present invention, it is possible to enhance the stability of an output voltage while suppressing an increase in the size of a power supply device and an increase in the power loss.

DESCRIPTION OF EMBODIMENTS

Hereinafter, embodiments of a DC power supply circuit will be described in detail with reference to the accompanying drawings. In the description of the drawings, the same elements will be denoted by the same reference signs, without redundant description.

Figure 1:
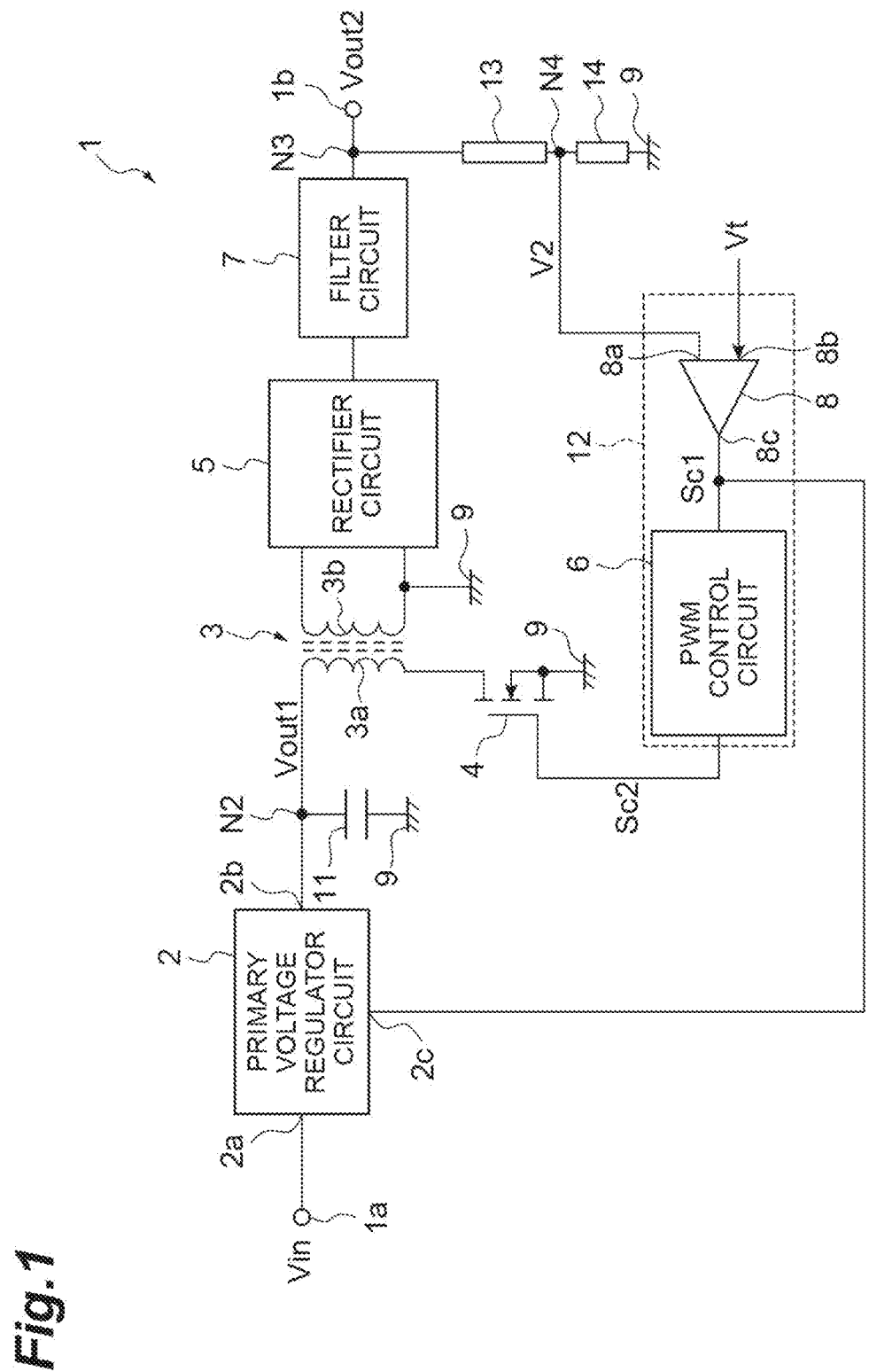
FIG. 1 is a circuit diagram illustrating a configuration of a DC power supply circuit 1 according to an embodiment.

FIG. 1 is a circuit diagram illustrating a configuration of a DC power supply circuit 1 according to an embodiment. As illustrated in FIG. 1, the DC power supply circuit 1 includes a voltage regulator circuit 2, a transformer 3, a transistor 4, a rectifier circuit 5, a pulse width modulation (PWM) control circuit 6, a filter circuit 7, and an error amplifier 8. The voltage regulator circuit 2 is a series regulator. The transformer 3, the transistor 4, the rectifier circuit 5, and the PWM control circuit 6 form a switching regulator. The voltage regulator circuit 2 is provided in front of (on the primary side of) the transformer 3. In other words, the switching regulator is provided after the series regulator.

The voltage regulator circuit 2 includes an input terminal 2a, an output terminal 2b, and a control input terminal 2c. The input terminal 2a is electrically connected to a power input terminal 1a of the DC power supply circuit 1. An input voltage Vin supplied from the outside of the DC power supply circuit 1 is input to the input terminal 2a via the power input terminal 1a. The voltage regulator circuit 2 generates an output voltage Vout1 within a range where the voltage value of the input voltage Vin is the upper limit, and outputs the output voltage Vout1 from the output terminal 2b. The magnitude of the output voltage Vout1 is controlled by a control signal Sc1 input to the control input terminal 2c. The control signal Sc1 is a control signal corresponding to a target voltage, and is generated by the error amplifier 8.

Figure 2:
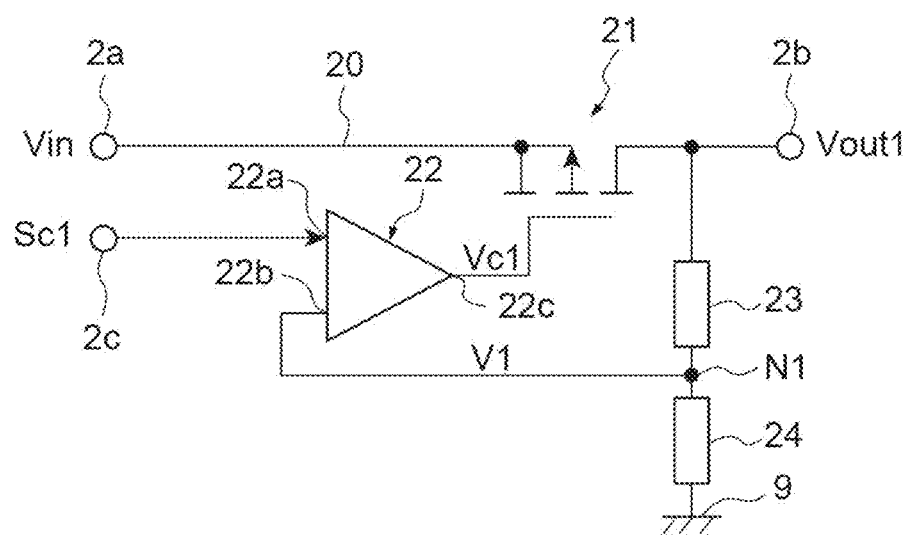
FIG. 2 is a circuit diagram illustrating a specific example of a voltage regulator circuit 2.

FIG. 2 is a circuit diagram illustrating a specific example of the voltage regulator circuit 2. The voltage regulator circuit 2 includes a transistor 21, an amplifier 22, and resistors 23 and 24. The transistor 21 is provided in series in a power line 20 that connects the input terminal 2a and the output terminal 2b. That is, one current terminal of the transistor 21 is connected to the input terminal 2a, and the other current terminal is connected to the output terminal 2b.

The transistor 21 is a field effect transistor (FET), for example, and is a p-channel MOSFET as an example. When the transistor 21 is a p-channel MOSFET, a source terminal of the transistor 21 is connected to the input terminal 2a, and a drain terminal is connected to the output terminal 2b. In addition, this example does not exclude the possibility that another electric element such as a resistor or a diode is provided between the input terminal 2a and the transistor 21 and/or between the transistor 21 and the output terminal 2b. Further, a PNP transistor may be used as the transistor 21 instead of the p-channel MOSFET.

The amplifier 22 controls a voltage applied to a control terminal (a gate terminal) of the transistor 21. The amplifier 22 includes input terminals 22a and 22b and an output terminal 22c. One of the input terminals 22a and 22b is an inverting input terminal, and the other is a non-inverting input terminal. The input terminal 22a is connected to the control input terminal 2c, and receives the control signal Sc1. The input terminal 22b is connected to a node N1 between the resistors 23 and 24 connected in series to each other. A series circuit including the resistors 23 and 24 is connected between the output terminal 2b and a reference potential line (also referred to as a GND line or a ground line) 9. Therefore, a voltage V1 obtained by dividing the output voltage Vout1 according to the ratio of the resistors 23 and 24 is input to the input terminal 22b.

The amplifier 22 generates a control voltage Vc1 according to a difference between the control signal Sc1 and the voltage V1, and outputs the voltage from the output terminal 22c. The output terminal 22c is connected to the control terminal of the transistor 21, and the control voltage Vc1 is applied to the control terminal of the transistor 21. According to the above configuration, the control voltage Vc1 is fed back so that the voltage of the node N1 approaches the control signal Sc1, and as a result, the output voltage Vout1 is controlled to a desired magnitude according to the control signal Sc1. In addition, although the voltage V1 divided by the resistors 23 and 24 is input to the amplifier 22 in the present embodiment, there is no limitation to this embodiment as long as a voltage corresponding (or proportional) to the output voltage Vout1 can be input to the amplifier 22.

Reference is made again to FIG. 1. The transformer 3 includes a primary winding 3a and a secondary winding 3b. One end of the primary winding 3a is connected to the output terminal 2b of the voltage regulator circuit 2. A capacitor 11 is connected between the reference potential line 9 and a node N2 between the output terminal 2b and the primary winding 3a. The capacitor 11 is a bypass capacitor provided to decrease an output impedance of the voltage regulator circuit 2. A pulsed current flows through the transformer 3 due to the switching on and off of the transistor 4, and the pulsed current includes the switching frequency of the transistor 4 and the harmonics thereof. Since the capacitor 11 is connected to the node N2, the pulsed current is supplied from the capacitor 11, and the voltage regulator circuit 2 can operate stably.

Further, the other end of the primary winding 3a is connected to the reference potential line 9 via the transistor 4. That is, the other end of the primary winding 3a is connected to one current terminal of the transistor 4, and the other current terminal of the transistor 4 is connected to the reference potential line 9.

The transistor 4 is an example of a switch element in the present embodiment. The transistor 4 is a field effect transistor (FET), for example, and is an n-channel MOSFET as an example. When the transistor 4 is an n-channel MOSFET, a drain terminal of the transistor 4 is connected to the primary winding 3a, and a source terminal is connected to the reference potential line 9. In addition, this example does not exclude the possibility that another electric element such as a resistor or a diode is provided between the primary winding 3a and the transistor 4 and/or between the transistor 4 and the reference potential line 9. Further, an NPN transistor may be used as the transistor 4 instead of the n-channel MOSFET.

The transistor 4 alternately repeats switching on and off of the current flowing through the primary winding 3a. A control terminal (a gate terminal) of the transistor 4 is connected to the PWM control circuit 6, and the switching on and off of the transistor 4 is controlled by a PWM signal Sc2 provided from the PWM control circuit 6. When the transistor 4 enters an on state, electric power generated by the voltage regulator circuit 2 is supplied to the primary winding 3a of the transformer 3. When the transistor 4 enters an off state, the supply of the electric power generated by the voltage regulator circuit 2 to the primary winding 3a is blocked.

The PWM control circuit 6 is configured by, for example, an IC in which a plurality of logic circuits are integrated. The PWM control circuit 6 receives a clock signal having a predetermined frequency from the outside, and generates a PWM signal Sc2 having a frequency according to the frequency of the clock signal. The duty ratio of the PWM signal Sc2 is set on the basis of the control signal Sc1 output from the error amplifier 8. Therefore, the PWM control circuit 6 and the error amplifier 8 form a control circuit 12 that controls the on/off duty ratio of the transistor 4 according to the target voltage.

In addition, in the present embodiment, the duty ratio is a ratio (W1/W2) of a Full Width at Half Maximum W1 of an ON Pulse and a pulse period W2. When the duty ratio increases, the amount of electric power supplied to the primary winding 3a increases, and the voltage output from the secondary winding 3b increases. In contrast, when the duty ratio decreases, the amount of electric power supplied to the primary winding 3a decreases, and the voltage output from the secondary winding 3b decreases. The duty ratio controlled by the PWM control circuit 6 is always larger than 0.

The voltage output from the secondary winding 3b mainly includes AC components having a cycle corresponding to the pulse period W2 of the PWM control. The rectifier circuit 5 is provided to smooth the AC components. That is, the rectifier circuit 5 is connected to the secondary winding 3b of the transformer 3, and converts the voltage output from the secondary winding 3b into a DC voltage. In an example, the rectifier circuit 5 has a capacitor-input type configuration. An example of a capacitor-input type rectifier circuit is a voltage multiplier rectifier circuit obtained by combining a plurality of diodes and a plurality of capacitors.

Figure 3:
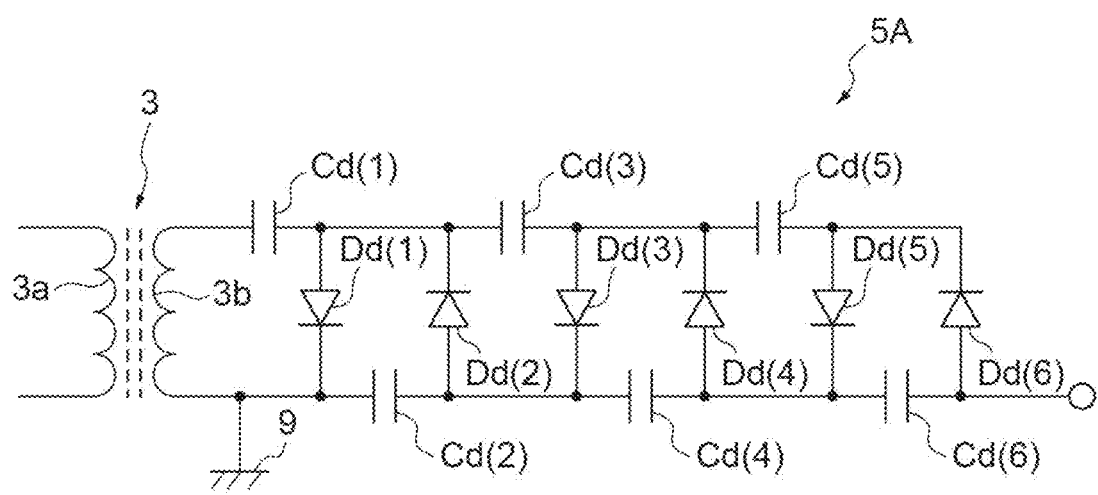
FIG. 3 is a circuit diagram illustrating a configuration of a Cockcroft-Walton circuit 5A as an example of a voltage multiplier rectifier circuit.

FIG. 3 is a circuit diagram illustrating a configuration of a Cockcroft-Walton (CW) circuit 5A as an example of a voltage multiplier rectifier circuit. The CW circuit 5A includes two capacitor rows including a plurality of capacitors connected in series, and a plurality of diodes connecting the two capacitor rows. Specifically, the CW circuit 5A includes $N_1$ capacitors Cd(1) to Cd($N_1$) and $N_1$ diodes Dd(1) to Dd($N_1$) ($N_1$ is an integer of 2 or more, and the case of $N_1$=6 is illustrated in the drawing).

Odd-number stage capacitors Cd($2m-1$) (m is an integer) are connected in series, and one end thereof is connected to one end of the secondary winding 3b. Further, even-number stage capacitors Cd($2m$) are connected in series, and one end thereof is connected to the other end of the secondary winding 3b. In addition, the other end of the secondary winding 3b may be connected to the reference potential line 9.

Further, an anode of the diode Dd(n) (n is an integer of 1 or more) is connected to a high-voltage side electrode of the capacitor Cd(n), and a cathode of the diode Dd(n) is connected to a low-voltage side electrode of the capacitor Cd(n+1). Further, the cathode of the last stage diode Dd($N_1$) is connected to the high-voltage side electrode of the capacitor Cd($N_1$-1). In addition, although the CW circuit 5A for outputting a negative high voltage is illustrated in this example, the direction of the diodes Dd(1) to Dd($N_1$) is reversed in the case of a CW circuit for outputting a positive high voltage.

Reference is made again to FIG. 1. The filter circuit 7 is a low-pass filter provided after the rectifier circuit 5. The filter circuit 7 reduces periodic ripple noise superimposed on the output voltage of the rectifier circuit 5 resulting from the switching of the transistor 4. Since the cycle of the ripple noise depends on the on/off cycle of the transistor 4, the filter circuit 7 has filter characteristics for removing a frequency corresponding to the on/off cycle (that is, the pulse period W2 described above) of the transistor 4.

The output terminal of the filter circuit 7 is connected to the power output terminal 1b of the DC power supply circuit 1. The voltage after filtering is output from the power output terminal 1b to the outside of the DC power supply circuit 1 as an output voltage Vout2. In addition, the filter circuit 7 may be configured by a combination of resistors and capacitors. Further, the filter circuit 7 may be configured by a combination of inductors and capacitors or a combination of resistors, inductors, and capacitors. Further, the filter circuit 7 may be omitted if unnecessary.

The error amplifier 8 forms a part of the control circuit 12 as described above, and generates the control signal Sc1 according to the difference between the target voltage and the output voltage Vout2. Specifically, the DC power supply circuit 1 further includes resistors 13 and 14. The resistors 13 and 14 are connected in series between the power line and the reference potential line 9. That is, one end of a series circuit including the resistors 13 and 14 is connected to a node N3 between the power output terminal 1b and the filter circuit 7. The other end of the series circuit is connected to the reference potential line 9.

The error amplifier 8 includes input terminals 8a and 8b and an output terminal 8c. One of the input terminals 8a and 8b is an inverting input terminal, and the other is a non-inverting input terminal. The input terminal 8a is connected to a node N4 between the resistors 13 and 14. Therefore, a voltage V2 obtained by dividing the output voltage Vout2 according to the ratio of the resistors 13 and 14 is input to the input terminal 8a. The input terminal 8b receives a voltage Vt corresponding to the target voltage. The voltage Vt has a magnitude obtained by dividing the target voltage of the output voltage Vout2 according to the ratio of the resistors 13 and 14. The error amplifier 8 generates the control signal Sc1 according to the difference between the voltage Vt and the voltage V2, and outputs the signal from the output terminal 8c.

According to the above configuration, since the difference between the output voltage Vout2 and the target voltage is fed back to the attenuation rate in the voltage regulator circuit 2 and the on/off duty ratio of the transistor 4 through the control signal Sc1, the output voltage Vout2 can approach the target voltage. In addition, although the voltage V2 divided by the resistors 13 and 14 is input to the error amplifier 8 in the present embodiment, there is no limitation to this embodiment as long as a voltage corresponding (or proportional) to the output voltage Vout2 can be input to the error amplifier 8.

Figure 4:
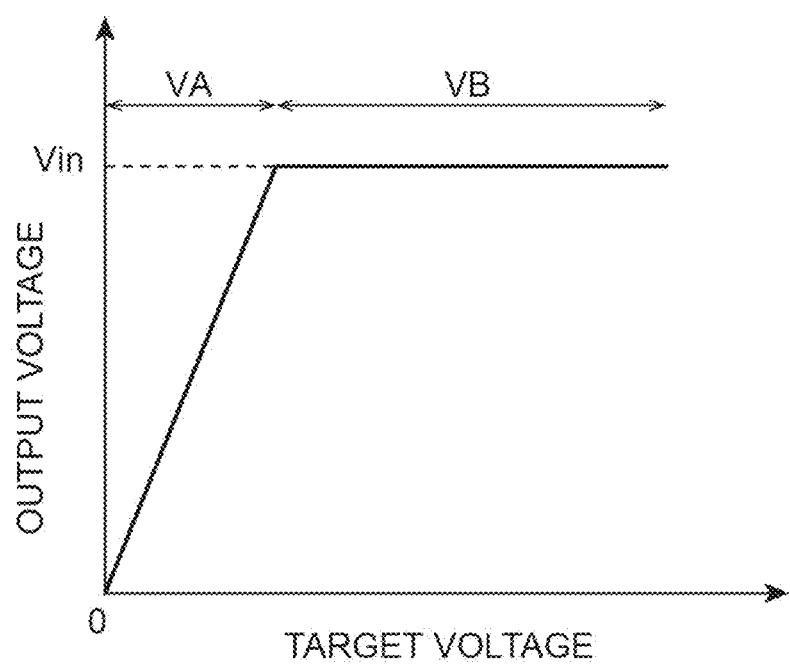
FIG. 4 is a graph illustrating a relationship between a target voltage and an output voltage Vout1 of the voltage regulator circuit 2.

Here, operations of the voltage regulator circuit 2 and the transistor 4 will be described in further detail. FIG. 4 is a graph illustrating a relationship between the target voltage and the output voltage Vout1 of the voltage regulator circuit 2. In FIG. 4, a horizontal axis represents a voltage value of the target voltage, and a vertical axis represents a voltage value of the output voltage Vout1.

In the present embodiment, when the target voltage is included in a first voltage range VA, the magnitude of the control voltage Vc1 is set such that the transistor 21 of the voltage regulator circuit 2 operates in a linear region. Therefore, in the first voltage range VA, when the target voltage increases, the output voltage Vout1 increases in proportion to the target voltage. In addition, when the target voltage is 0 (V), the output voltage Vout1 is also set to 0 (V). The maximum value of the output voltage Vout1 is substantially equal to the input voltage Vin.

Further, when the target voltage is included in a second voltage range VB higher than the first voltage range VA, the magnitude of the control voltage Vc1 is set such that the transistor 21 of the voltage regulator circuit 2 operates in a saturation region. Therefore, in the second voltage range VB, the output voltage Vout1 is constant (the input voltage Vin) even when the target voltage varies. In addition, the second voltage range VB being higher than the first voltage range VA means that the minimum voltage of the second voltage range VB is equal to or higher than the maximum voltage of the first voltage range VA.

Figure 5:
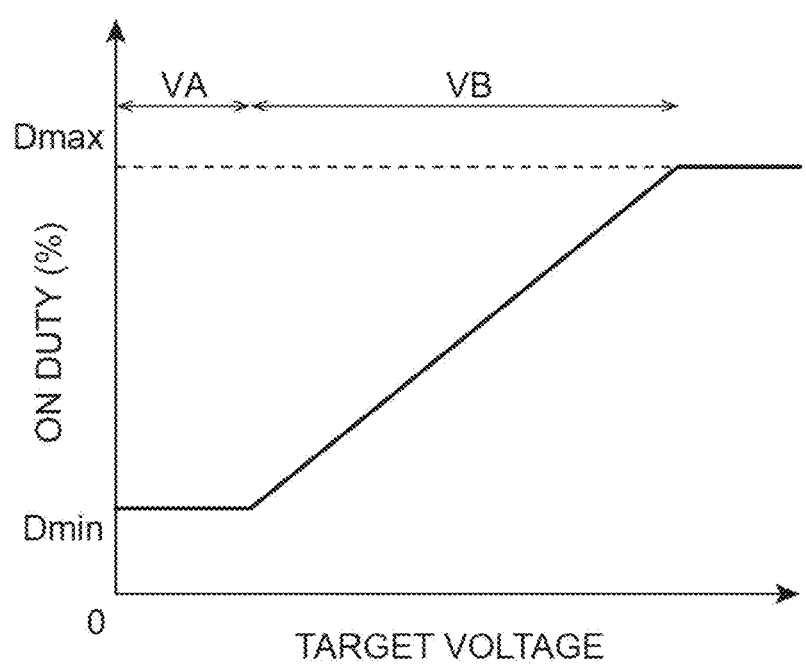
FIG. 5 is a graph illustrating a relationship between a target voltage and an on/off duty ratio of a transistor 4.

FIG. 5 is a graph illustrating a relationship between the target voltage and the on/off duty ratio of the transistor 4. In FIG. 5, a horizontal axis represents a voltage value of the target voltage, and a vertical axis represents the duty ratio.

In the present embodiment, when the target voltage is included in the first voltage range VA, the PWM control circuit 6 sets the duty ratio of the PWM signal Sc2 to be constant. In this case, the duty ratio Dmin is the lowest value within a change range of the duty ratio, but is always larger than 0. In other words, a pulse is always present every PWM cycle, and intermittent oscillation is not performed.

Further, when the target voltage is included in the second voltage range VB, the PWM control circuit 6 changes the duty ratio of the PWM signal Sc2 according to the target voltage. In an example, in the second voltage range VB, when the target voltage increases, the duty ratio increases in proportion to the target voltage. In addition, the relationship between the target voltage and the duty ratio in the second voltage range VB is not limited to a proportional relationship, but various relationships of a monotonically increasing relationship may be applied. In addition, the maximum value Dmax of the duty ratio is smaller than 1. Therefore, an OFF period of the transistor 4 is always present every PWM cycle.

The operation of the DC power supply circuit 1 of the present embodiment is as follows. When an electric power having a certain voltage value is input to the power line 20, the magnitude of the output voltage Vout1 is controlled by the transistor 21 using the voltage value as an upper limit. When the target voltage is included in the relatively low first voltage range VA, the transistor 21 operates in a linear region, and the magnitude of the output voltage Vout1 is changed according to the control voltage Vc1 input to the control terminal of the transistor 21. Further, when the target voltage is included in the relatively high second voltage range VB, the magnitude of the output voltage Vout1 is substantially equal to the input voltage Vin regardless of the control voltage Vc1 input to the control terminal of the transistor 21.

The output voltage Vout1 from the transistor 21 controlled in this manner is input to the primary winding 3a of the transformer 3. In this case, the transistor 4 alternately repeats switching on and off the current flowing through the primary winding 3a. When the target voltage is included in the first voltage range VA, the PWM control circuit 6 sets the duty ratio to be constant. Further, when the target voltage is included in the second voltage range VB, the PWM control circuit 6 changes the duty ratio according to the target voltage. A voltage generated in the secondary winding 3b of the transformer 3 is converted into a DC voltage by the rectifier circuit 5, and ripple noise is removed therefrom by the filter circuit 7, and after that, the voltage is output from the power output terminal 1b to the outside of the DC power supply circuit 1.

The effects obtained by the DC power supply circuit 1 of the present embodiment described above will be described together with the conventional problems. In general, in a power supply circuit for obtaining a low voltage of 5 V or 12 V, the output voltage is fixed to a desired magnitude. On the other hand, a power supply circuit capable of outputting a high voltage of 1000 V, for example, is designed so as to be able to freely change the output voltage to a voltage within an outputtable range (for example, 0 V to 1000 V). Such a high voltage is used, for example, in a measurement device such as a photomultiplier tube (PMT) or a semiconductor photosensor.

In a high-voltage power supply circuit, although it is ideal to obtain a stable voltage value at any output voltage in a variable range, it is not so actually. In particular, the lower the set output voltage, the more the characteristics deteriorates. An AC voltage (ripple noise) resulting from switching is superimposed in addition to a DC voltage on the output of a high-voltage power supply, and the lower the output voltage and the smaller the current supplied to a load, the larger become the AC components. When the load is a measurement device such as a PMT or a semiconductor photosensor, AC components are mixed into measurement signals, which causes measurement errors.

The reasons why AC components increase under conditions that the output voltage is low and the current supplied to the load is small are as follows. That is, in a DC power supply in which a transformer and a capacitor-input type rectifier circuit are combined, the transformer operates in both a forward mode and a flyback mode. The forward mode is a mode in which energy is transmitted to the secondary winding of the transformer when the switch element is in the ON state. In this mode, a voltage according to the turns ratio is generated in the secondary winding of the transformer. Further, the flyback mode is a mode in which energy is accumulated when the switch element is in the ON state and energy is discharged from the secondary winding when the switch element is in the OFF state.

The flyback mode is dominant when a high voltage is to be output, and the forward mode is dominant when a low voltage is to be output. Further, in the forward mode, it is not possible to lower the output voltage to a voltage or lower, the voltage being a multiplication of a turns ratio of the transformer and a step-up factor of the rectifier circuit by the input voltage. Therefore, when it is necessary to lower the output voltage than the above, periodic switching is changed to intermittent switching. The output voltage varies greatly in such an intermittent operation (intermittent oscillation), and the AC components superimposed on the output voltage increase.

A low-pass filter may be provided to remove such AC components from the output voltage. However, since the cycle of intermittent oscillation is several times the switching cycle, it is necessary to provide a low-pass filter capable of removing the AC component having such a long cycle. Further, in order to remove AC components having a long cycle (low frequency), a resistor or an inductor having high impedance and a capacitor having low impedance are required. Therefore, the component size of a low-pass filter increases, and as a result, the entire power supply device becomes excessively large.

Figure 13:
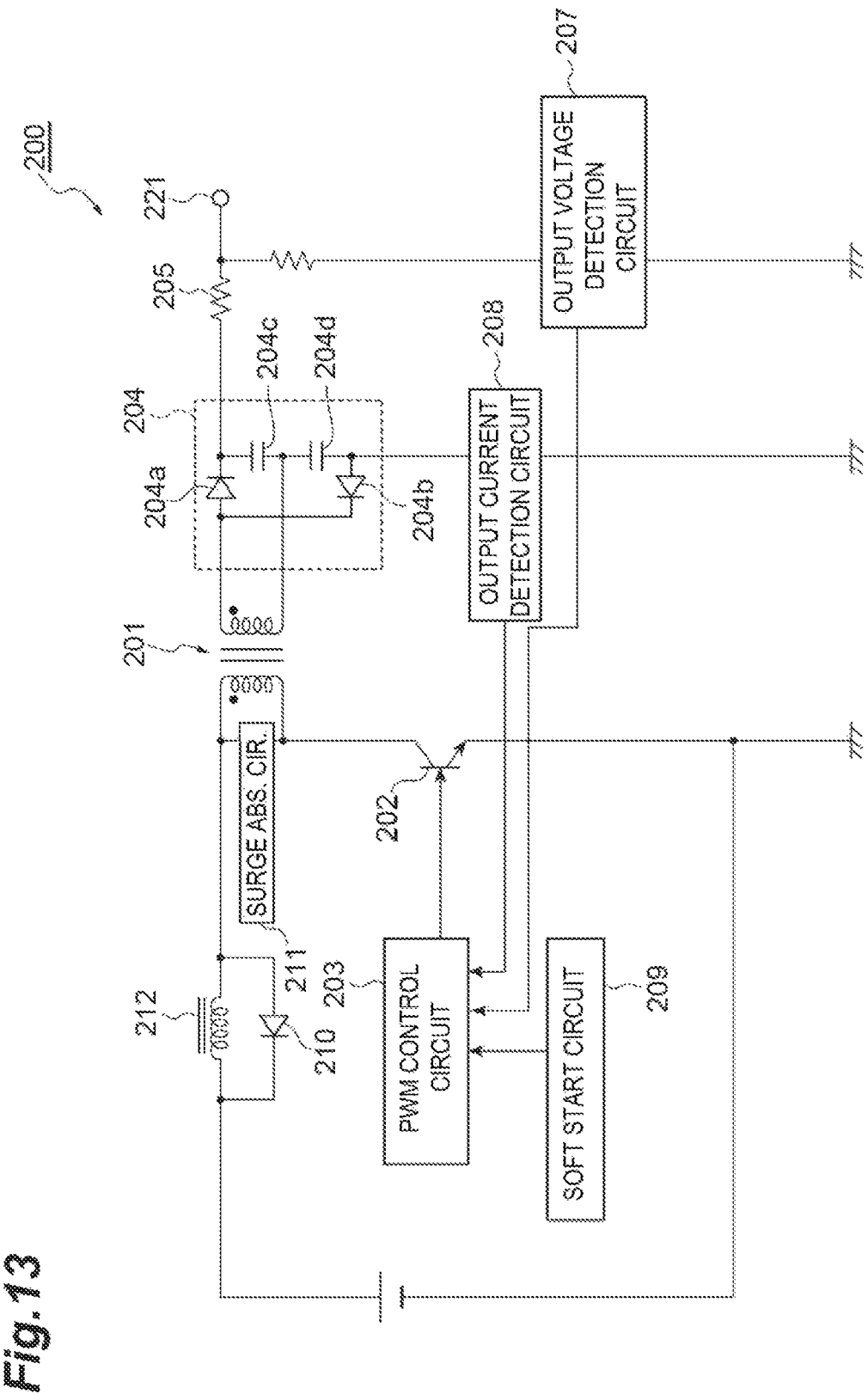
FIG. 13 is a diagram illustrating a circuit disclosed in Patent Document 2.

Further, in the circuit (see FIG. 13) disclosed in Patent Document 2, although the inductor 212 is provided to remove AC components, the inductance of the inductor 212 must be increased when the current is very small, and as a result, the size of the inductor 212 becomes large, and therefore, the entire power supply device becomes excessively large.

Further, a method of providing a series regulator in front of the switching regulator to control the magnitude of an output voltage using the series regulator while maintaining a constant switching duty ratio may be considered. However, the series regulator has more power loss than the switching regulator. Controlling the magnitude of an output voltage over the entire output voltage range using the series regulator is not desirable since the power loss becomes significantly large. In addition, the power loss in the series regulator is calculated by the product of the square of the output current and the ON resistance of the transistor.

For the above problem, in the DC power supply circuit 1 of the present embodiment, when the target voltage is included in the relatively low first voltage range VA, the PWM control circuit 6 sets the duty ratio to be constant and the transistor 21 operates in a linear region. That is, in the first voltage range VA, the series regulator realized by the transistor 21 controls the magnitude of the output voltage Vout2, and the switching regulator realized by the transistor 4 and the transformer 3 does not control the magnitude of the output voltage Vout2.

In this way, since the lower limit of the duty ratio of the PWM signal Sc2 can be provided, the transistor 4 can always be switched on and off at constant cycles. Therefore, it is possible to avoid intermittent oscillation of the transistor 4 and reduce AC components such as ripple noise resulting from switching using the small filter circuit 7. Therefore, it is possible to suppress an increase in the size of the power supply device resulting from providing a low-pass filter or the like for coping with intermittent oscillation.

Further, when the target voltage is included in the relatively high second voltage range VB, the PWM control circuit 6 changes the duty ratio according to the target voltage and the transistor 21 operates in a saturation region. That is, in the second voltage range VB, the series regulator realized by the transistor 21 does not control the magnitude of the output voltage Vout2, and the switching regulator realized by the transistor 4 and the transformer 3 controls the magnitude of the output voltage Vout2.

In this way, since the efficiency of the series regulator can be maximized in the second voltage range VB in which large electric power is required, it is possible to reduce power loss in the series regulator. Further, it is possible to reduce heat generation from the circuit.

From the above, according to the DC power supply circuit 1 of the present embodiment, it is possible to enhance the stability of the output voltage Vout2 while suppressing an increase in the size of the power supply device and an increase in the power loss.

Further, as in the present embodiment, the rectifier circuit 5 may be a capacitor-input type rectifier circuit. Thus, a voltage output from the secondary winding 3b can be converted into a DC voltage using a simple circuit configuration. In this case, the rectifier circuit 5 may be a voltage multiplier rectifier circuit (for example, a CW circuit) in which a plurality of diodes Dd(1) to Dd($N_1$) and a plurality of capacitors Cd(1) to Cd($N_1$) are combined. Thus, it is possible to easily obtain a high voltage using a simple circuit configuration.

First Modification

Figure 6:
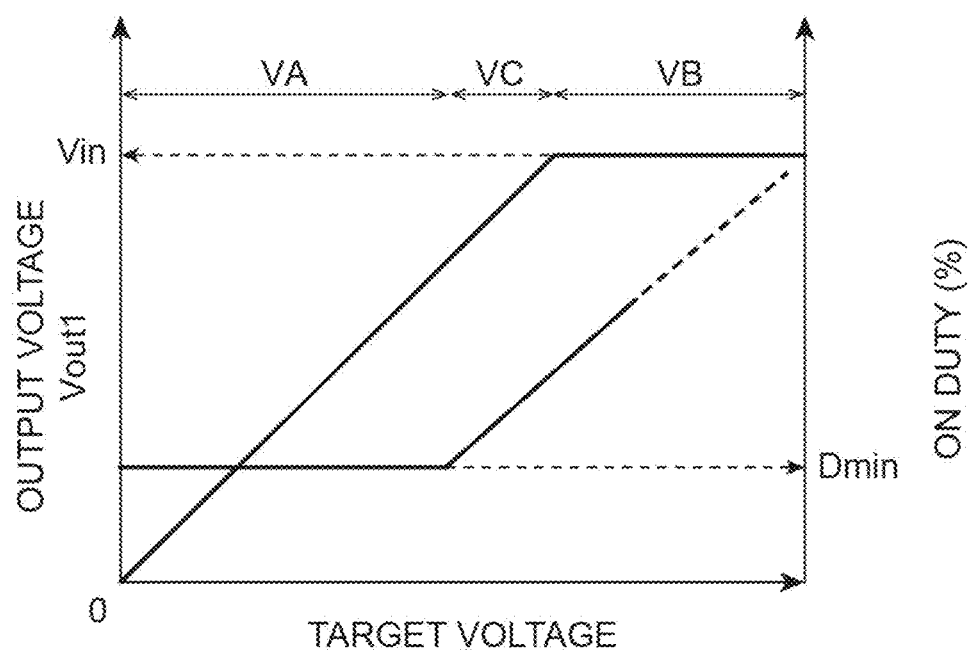
FIG. 6 is a graph illustrating a relationship between a duty ratio of the transistor 4 and an output voltage Vout1 of the voltage regulator circuit 2 and a target voltage according to a first modification.

FIG. 6 is a graph illustrating a relationship between the duty ratio of the transistor 4 and the output voltage Vout1 of the voltage regulator circuit 2 and the target voltage according to a first modification of the above embodiment. In FIG. 6, a horizontal axis represents the target voltage, a left vertical axis represents the output voltage Vout1, and a right vertical axis represents the duty ratio.

In the above embodiment, the first voltage range VA and the second voltage range VB are defined depending on the magnitude of the target voltage, and in the present modification, a third voltage range VC present between the first voltage range VA and the second voltage range VB is further defined. The third voltage range VC is higher than the first voltage range VA, and is lower than the second voltage range VB. That is, the minimum voltage of the third voltage range VC is equal to or higher than the maximum voltage of the first voltage range VA, and the maximum voltage of the third voltage range VC is equal to or lower than the minimum voltage of the second voltage range VB.

Further, when the target voltage is included in the third voltage range VC, the magnitude of the control voltage Vc1 is set such that the transistor 21 of the voltage regulator circuit 2 operates in a linear region. Therefore, in the third voltage range VC, when the target voltage increases, the output voltage Vout1 increases in proportion to the target voltage. Further, when the target voltage is included in the third voltage range VC, the PWM control circuit 6 changes the duty ratio of the transistor 4 according to the target voltage. In an example, when the target voltage increases in the third voltage range VC, the duty ratio increases in proportion to the target voltage. In addition, also in the third voltage range VC, the relationship between the target voltage and the duty ratio is not limited to a proportional relationship, but various relationships of a monotonically increasing relationship may be applied.

As in the present modification, by providing the third voltage range VC in which both the series regulator and the switching regulator control the magnitude of the output voltage Vout1 between the first voltage range VA and the second voltage range VB, switching of control between the series regulator and the switching regulator can be performed smoothly.

Second Modification

Figure 7:
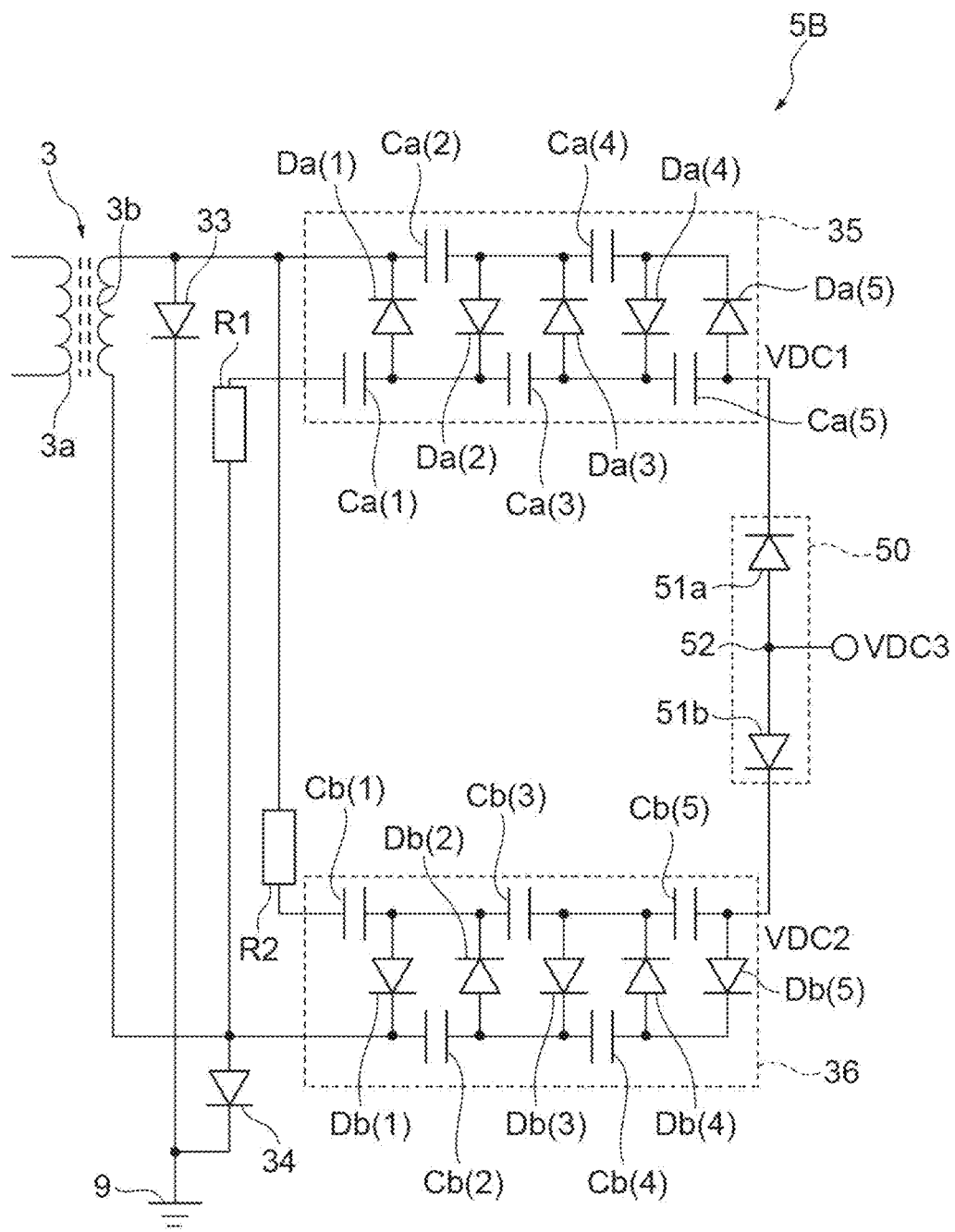
FIG. 7 is a circuit diagram illustrating a configuration of a rectifier circuit 5B according to a second modification.

FIG. 7 is a circuit diagram illustrating a configuration of a rectifier circuit 5B according to a second modification of the above embodiment. The rectifier circuit 5B of the present modification may be used as the rectifier circuit 5 of the above embodiment. The rectifier circuit 5B includes a first diode 33, a second diode 34, a first step-up rectifier circuit unit 35 and a second step-up rectifier circuit unit 36 connected in parallel between the transformer 3 and the voltage output terminal, and a voltage combining unit 50.

The anode of the first diode 33 is connected to one end of the secondary winding 3b. The cathode of the first diode 33 is connected to the reference potential line 9. The anode of the second diode 34 is connected to the other end of the secondary winding 3b. The cathode of the second diode 34 is connected to the reference potential line 9.

The first step-up rectifier circuit unit 35 is connected to both ends of the secondary winding 3b. The first step-up rectifier circuit unit 35 is formed by combining a plurality of stages of circuit portions each including a capacitor and a diode, and rectifies and steps up an AC voltage generated at both ends of the secondary winding 3b. The first step-up rectifier circuit unit 35 of the present modification is configured by a half-wave rectifier type CW circuit.

Specifically, the first step-up rectifier circuit unit 35 includes $N_1$ capacitors Ca(1) to Ca($N_1$) and $N_1$ diodes Da(1) to Da($N_1$) ($N_1$ is an integer of 2 or more, and the case of $N_1$=5 is illustrated in the drawing).

Even-number stage capacitors Ca(2$m$) (here, m=1, 2, 3, . . . ) are connected in series, and one end thereof is connected to one end of the secondary winding 3b. Further, odd-number stage capacitors Ca(2$m$-1) are connected in series, and one end thereof is connected to the other end of the secondary winding 3b via a resistor R1.

Further, the anode of the diode Da(n) (here, n=1, 2, 3, . . . ) is connected to a high-voltage side electrode of the capacitor Ca(n), and the cathode of the diode Da(n) is connected to a low-voltage side electrode of the capacitor Ca(n+1). Further, the cathode of the last stage diode Da($N_1$) is connected to the high-voltage side electrode of the capacitor Ca($N_1$-1).

That is, the first step-up rectifier circuit unit 35 is configured by combining $N_1$ stages of circuit portions each including the capacitor Ca(n) and the diode Da(n). In this way, a DC voltage VDC1 obtained by rectifying and stepping up the AC voltage in the secondary winding 3b is output from the output terminal, that is, the high-voltage side electrode of the capacitor Ca($N_1$), of the first step-up rectifier circuit unit 35.

The second step-up rectifier circuit unit 36 is connected to both ends of the secondary winding 3b. The second step-up rectifier circuit unit 36 is formed by combining a plurality of stages of circuit portions each including a capacitor and a diode, and rectifies and steps up the AC voltage generated at both ends of the secondary winding 3b with a phase (a phase difference of 180°) opposite to that of the above first step-up rectifier circuit unit 35. The second step-up rectifier circuit unit 36 of the present modification is configured by a half-wave rectifier type CW circuit similarly to the first step-up rectifier circuit unit 35.

Specifically, the second step-up rectifier circuit unit 36 includes $N_1$ capacitors Cb(1) to Cb($N_1$) and $N_1$ diodes Db(1) to Db($N_1$).

Even-number stage capacitors Cb(2m) are connected in series, and one end thereof is connected to the other end of the secondary winding 3b. Further, odd-number stage capacitors Cb(2m-1) are connected in series, and one end thereof is connected to one end of the secondary winding 3b via a resistor R2.

Further, the anode of the diode Db(n) is connected to a high-voltage side electrode of the capacitor Cb(n), and the cathode of the diode Db(n) is connected to a low-voltage side electrode of the capacitor Cb(n+1). Further, the cathode of the last stage diode Db($N_1$) is connected to the high-voltage side electrode of the capacitor Cb($N_1$-1).

That is, the second step-up rectifier circuit unit 36 is configured by combining $N_1$ stages of circuit portions each including the capacitor Cb(n) and the diode Db(n). In this way, a DC voltage VDC2 obtained by rectifying and stepping up the AC voltage in the secondary winding 3b is output from the output terminal, that is, the high-voltage side electrode of the capacitor Cb($N_1$), of the second step-up rectifier circuit unit 36.

The voltage combining unit 50 combines the DC voltage VDC1 output from the first step-up rectifier circuit unit 35 and the DC voltage VDC2 output from the second step-up rectifier circuit unit 36. The voltage combining unit 50 of the present modification includes two diodes 51a and 51b.

The cathode of the diode 51a is connected to the output terminal (the high-voltage side electrode of the capacitor Ca($N_1$)) of the first step-up rectifier circuit unit 35. The cathode of the diode 51b is connected to the output terminal (the high-voltage side electrode of the capacitor Cb($N_1$)) of the second step-up rectifier circuit unit 36. The anode of the diode 51a and the anode of the diode 51b are connected to each other at a connection point 52. By the above configuration, the DC voltage VDC1 and the DC voltage VDC2 are combined, and output from the connection point 52 as an output voltage VDC3 of the rectifier circuit 5B.

According to this rectifier circuit 5B, a phase of a ripple voltage generated in the first step-up rectifier circuit unit 35 is shifted by 180° from a phase of a ripple voltage generated in the second step-up rectifier circuit unit 36. Therefore, superimposition of the ripple voltage to a DC output portion due to spatial propagation coupling resulting from parasitic capacitance can be avoided as much as possible since these ripple voltages cancel each other. In particular, when the first step-up rectifier circuit unit 35 and the second step-up rectifier circuit unit 36 are disposed spatially line-symmetrically, such an effect becomes more remarkable.

Further, a frequency of the ripple voltage included in the final DC output is doubled as a result of addition of the ripple voltage from the first step-up rectifier circuit unit 35 and the ripple voltage from the second step-up rectifier circuit unit 36. Therefore, it is possible to reduce ripple significantly as described above. Further, it is possible to omit a low-pass filter circuit which requires high voltage-withstanding performance or reduce the size thereof significantly, and to avoid an increase in the circuit size. In addition, since it is not necessary to provide a plurality of resistors on the path of the output current, it is possible to decrease power loss.

Further, according to the present embodiment, since two step-up rectifier circuit units 35 and 36 having opposite phases are provided, it is not necessary to connect an intermediate point of the secondary winding 3b to the reference potential line (that is, a center tap is not necessary), and a single winding structure can be realized, and therefore, it is possible to perform step-up rectification while simplifying the secondary-side structure of the transformer, and reduce the size of the transformer and the peripheral circuit thereof. In particular, it is effective when using a split bobbin for the purpose of securing a voltage-withstanding performance on the secondary side.

Further, according to the rectifier circuit 5B of the present modification, since a doubled voltage is obtained with an output ratio of the center tap, the number of windings of the secondary winding can be halved. Therefore, it is possible to reduce line electrostatic capacitance and increase a driving frequency to reduce the size of the transformer. Further, according to the rectifier circuit 5B of the present modification, it is not necessary to take inter-winding coupling efficiency of the transformer and fluctuation of characteristics between transformers when two or more transformers are used into consideration. Further, according to the rectifier circuit 5B of the present modification, since the ripple frequency is doubled as compared to an ordinary CW circuit, it is possible to reduce the switching frequency for obtaining necessary specifications.

Third Modification

Figure 8:
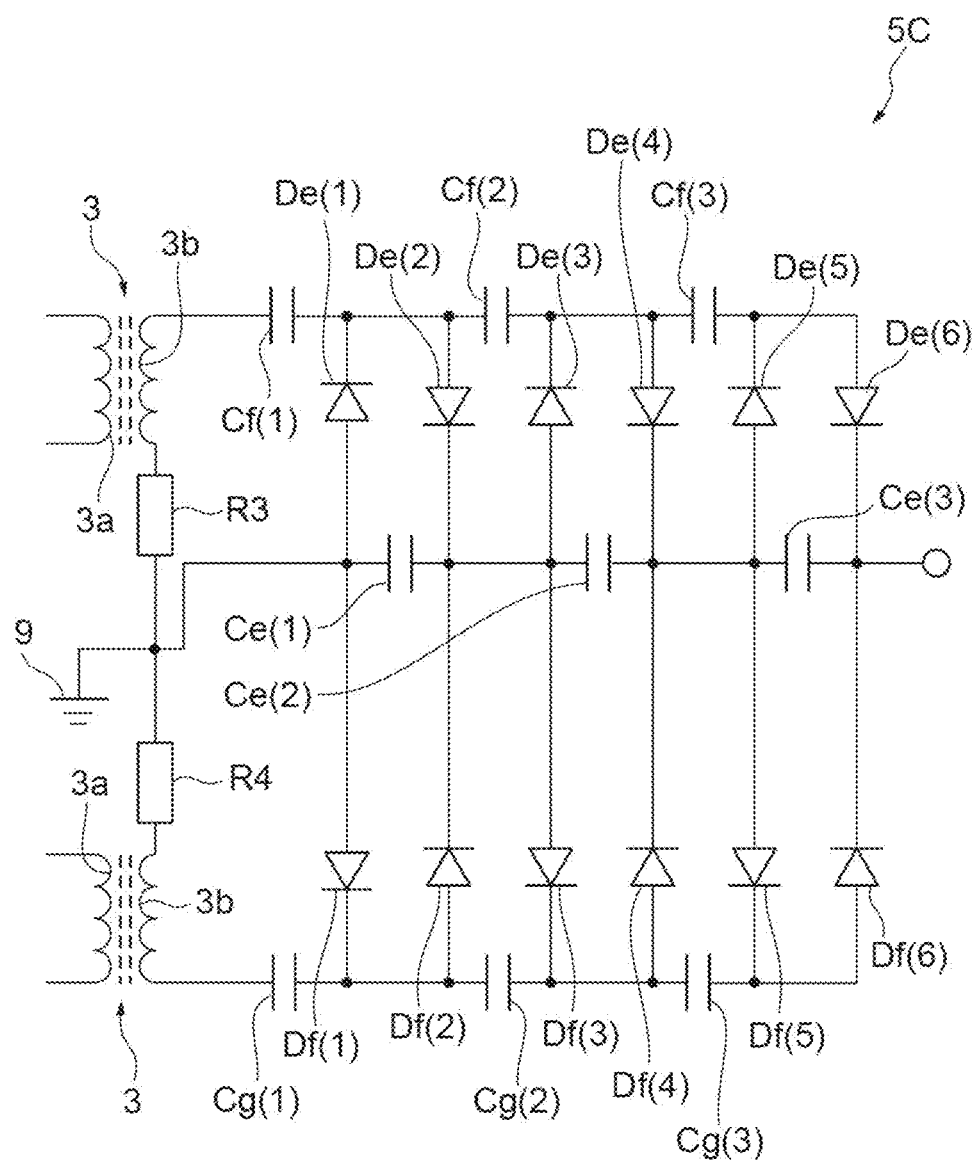
FIG. 8 is a circuit diagram illustrating a configuration of a rectifier circuit 5C according to a third modification.

FIG. 8 is a circuit diagram illustrating a configuration of a rectifier circuit 5C according to a third modification of the above embodiment. The rectifier circuit 5C of the present modification may be used as the rectifier circuit 5 of the above embodiment. The rectifier circuit 5C is a full-wave rectifier type CW circuit. In the rectifier circuit 5C, the secondary winding 3b is divided into two parts, two resistors R3 and R4 are connected in series therebetween, and the reference potential line 9 is connected to a connection point of the resistors R3 and R4.

Further, the rectifier circuit 5C includes $N_3$ capacitors Ce(1) to Ce($N_3$), $N_3$ capacitors Cf(1) to Cf($N_3$), and $N_3$ capacitors Cg(1) to Cg($N_3$) (the case of $N_3$=3 is illustrated in the drawing).

The capacitors Ce(n) are connected in series, and one end thereof is connected to the connection point of the resistors R3 and R4. The capacitors Cf(n) are connected in series, and one end thereof is connected to one end of the secondary winding 3b. Further, the capacitors Cg(n) are connected in series, and one end thereof is connected to the other end of the secondary winding 3b.

The rectifier circuit 5C further includes $2N_3$ diodes De(1) to De($2N_3$) and $2N_3$ diodes Df(1) to Df($2N_3$). The cathode of the odd-numbered diode De(2m−1) is connected to a high-voltage side electrode of the capacitor Cf(n), and the anode of the diode De(2m−1) is connected to a low-voltage side electrode of the capacitor Ce(n). The cathode of the even-numbered diode De(2m) is connected to a high-voltage side electrode of the capacitor Ce(n), and the anode of the diode De(2m) is connected to a low-voltage side electrode of the capacitor Cf(n+1). Further, the anode of the last stage diode De($2N_3$) is connected to the high-voltage side electrode of the capacitor Cf($N_3$).

Further, the cathode of the odd-numbered diode Df(2m−1) is connected to a high-voltage side electrode of the capacitor Cg(n), and the anode of the diode Df(2m−1) is connected to a low-voltage side electrode of the capacitor Ce(n). The cathode of the even-numbered diode Df(2m) is connected to a high-voltage side electrode of the capacitor Ce(n), and the anode of the diode Df(2m) is connected to a low-voltage side electrode of the capacitor Cg(n+1). Further, the anode of the last stage diode Df($2N_3$) is connected to the high-voltage side electrode of the capacitor Cg($N_3$).

Fourth Modification

Figure 9:
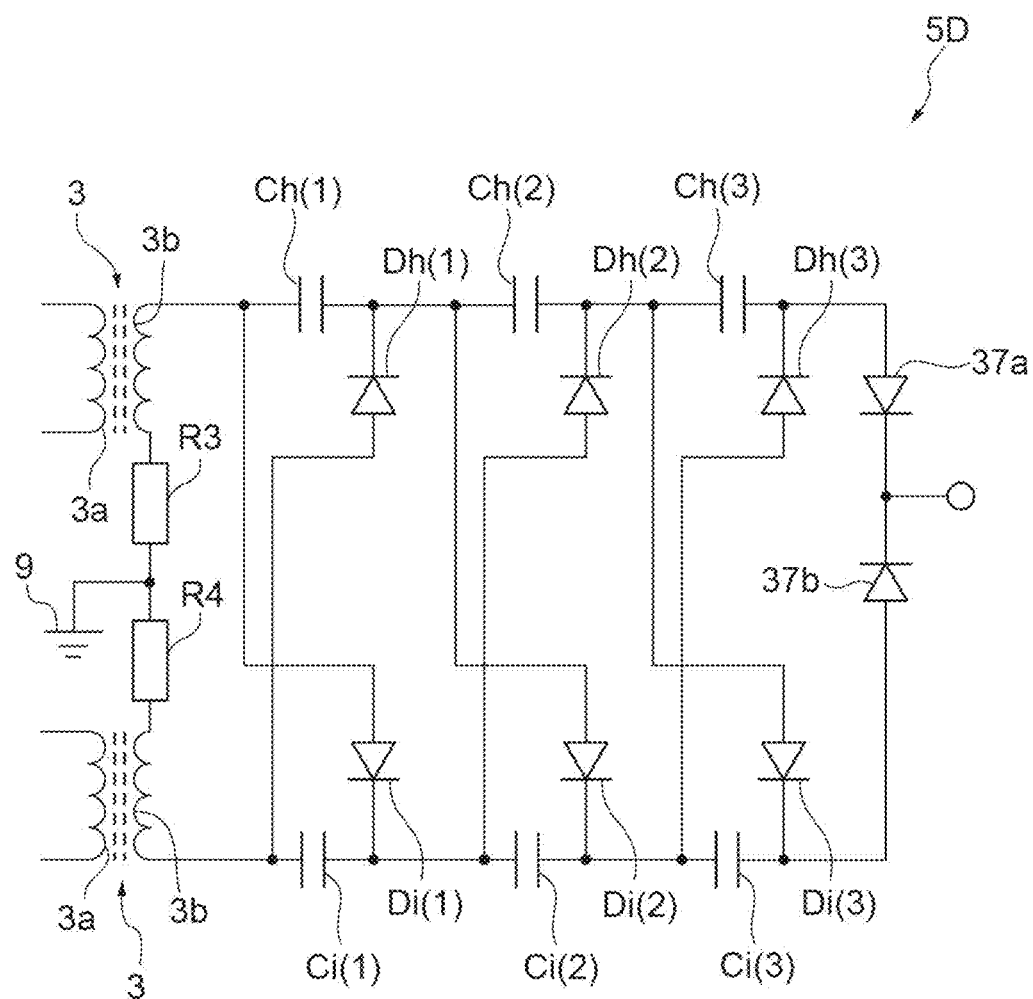
FIG. 9 is a circuit diagram illustrating a configuration of a rectifier circuit 5D according to a fourth modification.

FIG. 9 is a circuit diagram illustrating a configuration of a rectifier circuit 5D according to a fourth modification. The rectifier circuit 5D of the present modification may be used as the rectifier circuit 5 of the above embodiment. The rectifier circuit 5D is a balanced type CW circuit. In the rectifier circuit 5D, the secondary winding 3b is divided into two parts, two resistors R3 and R4 are connected in series therebetween, and the reference potential line 9 is connected to a connection point of the resistors R3 and R4.

Further, the rectifier circuit 5D includes $N_4$ capacitors Ch(1) to Ch($N_4$), $N_4$ capacitors Ci(1) to Ci($N_4$), $N_4$ diodes Dh(1) to Dh($N_4$), and $N_4$ diodes Di(1) to Di($N_4$) (the case of $N_4$=3 is illustrated in the drawing).

The capacitors Ch(n) are connected in series, and one end thereof is connected to one end of the secondary winding 3b. The capacitors Ci(n) are connected in series, and one end thereof is connected to the other end of the secondary winding 3b.

Further, the cathode of the diode Dh(n) is connected to a high-voltage side electrode of the capacitor Ch(n), and the anode of the diode Dh(n) is connected to a low-voltage side electrode of the capacitor Ci(n). Similarly, the cathode of the diode Di(n) is connected to a high-voltage side electrode of the capacitor Ci(n), and the anode of the diode Di(n) is connected to a low-voltage side electrode of the capacitor Ch(n).

In addition, the high-voltage side electrodes of the last stage capacitors Ch($N_4$) and Ci($N_4$) are connected to the anodes of diodes 37a and 37b. Further, the cathode of the diode 37a and the cathode of the diode 37b are connected to each other. By the above configuration, the high-voltage side electrode potentials of the last stage capacitors Ch($N_4$) and Ci($N_4$) are combined, and output from the connection point of the diodes 37a and 37b.

Fifth Modification

Figure 10:
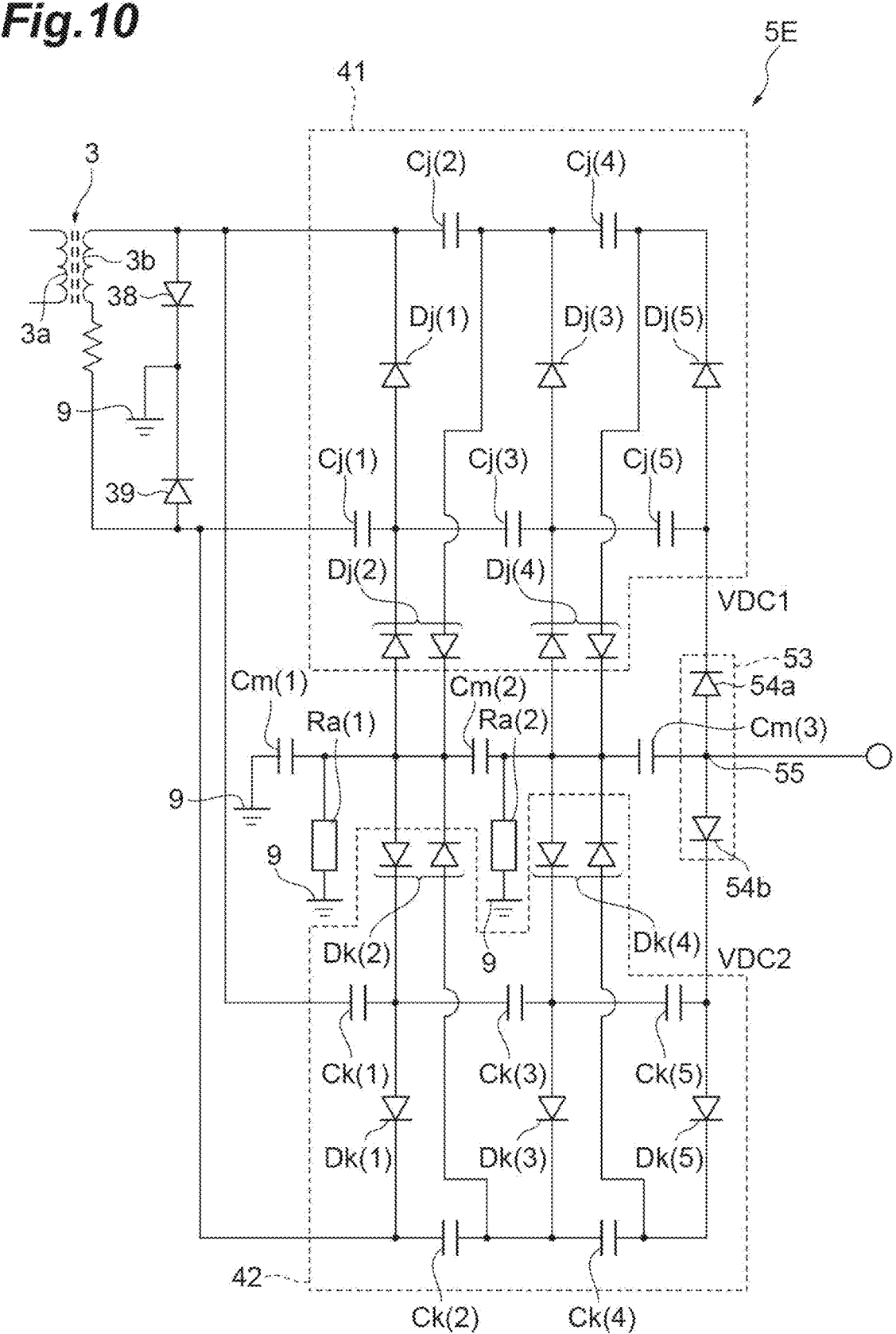
FIG. 10 is a circuit diagram illustrating a configuration of a rectifier circuit 5E according to a fifth modification.

FIG. 10 is a circuit diagram illustrating a configuration of a rectifier circuit 5E according to a fifth modification. The rectifier circuit 5E of the present modification may be used as the rectifier circuit 5 of the above embodiment. The rectifier circuit 5E is a multi stage output type step-up rectifier circuit. As illustrated in FIG. 10, the rectifier circuit 5E includes a first diode 38, a second diode 39, a first step-up rectifier circuit unit 41, a second step-up rectifier circuit unit 42, and a voltage combining unit 53.

The anode of the first diode 38 is connected to one end of the secondary winding 3b. The cathode of the first diode 38 is connected to the reference potential line 9. The anode of the second diode 39 is connected to the other end of the secondary winding 3b. The cathode of the second diode 39 is connected to the reference potential line 9.

The first step-up rectifier circuit unit 41 is connected to both ends of the secondary winding 3b. The first step-up rectifier circuit unit 41 is formed by combining a plurality of stages of circuit portions each including a capacitor and a diode, and rectifies and steps up a first half-wave of an AC voltage generated at both ends of the secondary winding 3b. The first step-up rectifier circuit unit 41 of the present modification is configured by a half-wave rectifier type CW circuit.

Specifically, the first step-up rectifier circuit unit 41 includes $N_1$ capacitors Cj(1) to Cj($N_1$) and diodes Dj(1) to Dj($N_1$) (the case of $N_1$=5 is illustrated in the drawing).

Even-number stage capacitors Cj(2m) are connected in series, and one end thereof is connected to one end of the secondary winding 3b. Further, odd-number stage capacitors Cj(2m−1) are connected in series, and one end thereof is connected to the other end of the secondary winding 3b.

Further, the anode of the diode Dj(n) is connected to a high-voltage side electrode of the capacitor Cj(n), and the cathode of the diode Dj(n) is connected to a low-voltage side electrode of the capacitor Cj(n+1). Further, the cathode of the last stage diode Dj($N_1$) is connected to a high-voltage side electrode of the capacitor Cj($N_1$−1). Further, the even-number stage diode Dj(2m) is configured by two diodes connected in series in the forward direction.

That is, the first step-up rectifier circuit unit 41 is configured by combining $N_1$ stages of circuit portions each including the capacitor Cj(n) and the diode Dj(n). In this way, a DC voltage VDC1 obtained by rectification and stepping-up is output from the high-voltage side electrode of the capacitor Cj($N_1$).

The second step-up rectifier circuit unit 42 is connected to both ends of the secondary winding 3b. The second step-up rectifier circuit unit 42 is formed by combining a plurality of stages of circuit portions each including a capacitor and a diode, and rectifies and steps up another half-wave, that is, a second half-wave, having a phase (a phase difference of 180°) opposite to the above first half-wave, of the AC voltage generated at both ends of the secondary winding 3b. The second step-up rectifier circuit unit 42 of the present modification is configured by a half-wave rectifier type CW circuit similarly to the first step-up rectifier circuit unit 41.

Specifically, the second step-up rectifier circuit unit 42 includes $N_1$ capacitors Ck(1) to Ck($N_1$) and a plurality of diodes Dk(1) to Dk($N_1$).

Even-number stage capacitors Ck(2m) are connected in series, and one end thereof is connected to the other end of the secondary winding 3b. Further, odd-number stage capacitors Ck(2m−1) are connected in series, and one end thereof is connected to one end of the secondary winding 3b.

Further, the anode of the diode Dk(n) is connected to a high-voltage side electrode of the capacitor Ck(n), and the cathode of the diode Dk(n) is connected to a low-voltage side electrode of the capacitor Ck(n+1). Further, the cathode of the last stage diode Dk(N₁) is connected to the high-voltage side electrode of the capacitor Ck(N₁−1). Further, the even-number stage diode Dk(2m) is configured by two diodes connected in series in the forward direction.

That is, the second step-up rectifier circuit unit 42 is configured by combining $N_1$ stages of circuit portions each including the capacitor Ck(n) and the diode Dk(n). In this way, a DC voltage VDC2 obtained by rectification and stepping-up is output from the high-voltage side electrode of the capacitor Ck($N_1$).

The voltage combining unit 53 combines the DC voltage VDC1 output from the first step-up rectifier circuit unit 41 and the DC voltage VDC2 output from the second step-up rectifier circuit unit 42. The voltage combining unit 53 of the present modification is configured by two diodes 54a and 54b.

The cathode of the diode 54a is connected to an output terminal (the high-voltage side electrode of the capacitor Cj($N_1$)) of the first step-up rectifier circuit unit 41. The cathode of the diode 54b is connected to an output terminal (the high-voltage side electrode of the capacitor Ck($N_1$)) of the second step-up rectifier circuit unit 42. The anode of the diode 54a and the anode of the diode 54b are connected to each other at a connection point 55. By the above configuration, the DC voltage VDC1 and the DC voltage VDC2 are combined, and output from the connection point 55 as an output voltage of the rectifier circuit 5E.

Further, the rectifier circuit 5E of the present modification includes $N_5$ capacitors Cm(1) to Cm($N_5$) connected in series ($N_5$ is an integer of $N_1/2$ or more and ($N_1/2+1$) or less).

One end of a series circuit of the capacitors Cm(1) to Cm($N_5$) is connected to the reference potential line 9, and the other end is connected to the connection point 55 of the voltage combining unit 53. Further, a connection point between the two diodes that form the even-number stage diode Dj(2m) of the first step-up rectifier circuit unit 41 and a connection point between the two diodes that form the even-number stage diode Dk(2m) of the second step-up rectifier circuit unit 42 are connected between the capacitors Cm(n) and Cm(n+1). ($N_5−1$) output voltages for multi stage output are output from the connection points between the capacitors Cm(1) to Cm($N_5$). In addition, in the drawing, resistors Ra(1) to Ra($N_5−1$) represent loads.

Sixth Modification

Figure 11:
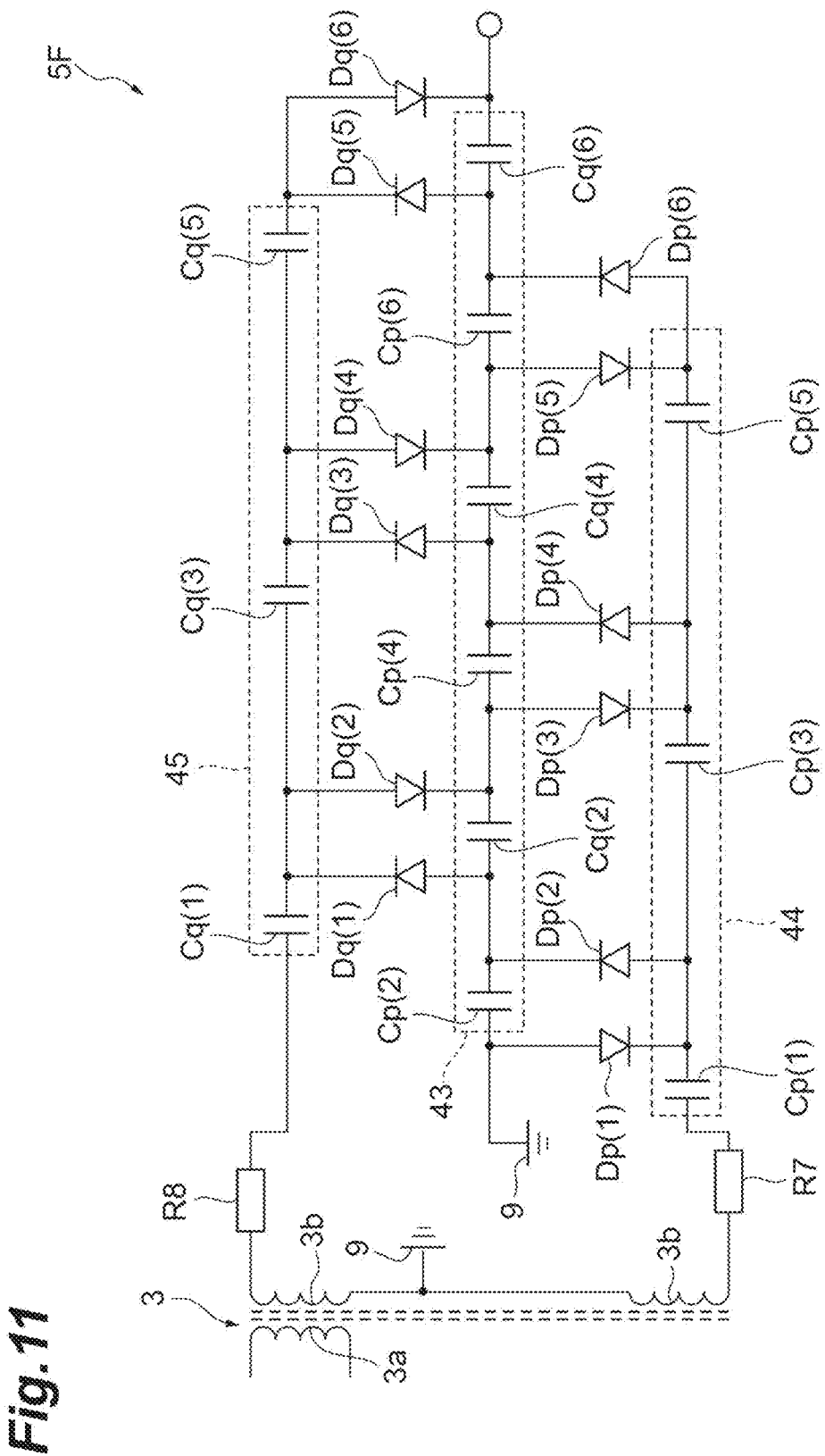
FIG. 11 is a circuit diagram illustrating a configuration of a rectifier circuit 5F according to a sixth modification.
Figure 12:
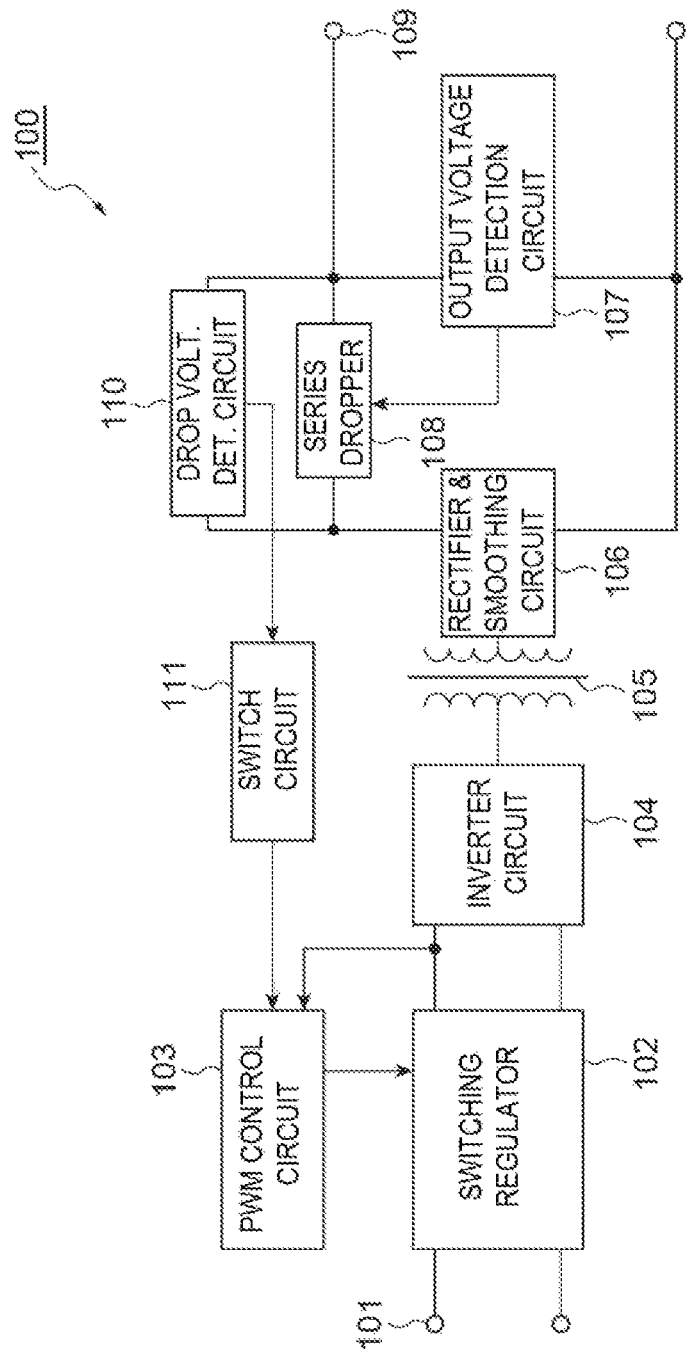
FIG. 12 is a diagram illustrating a circuit disclosed in Patent Document 1.

FIG. 11 is a circuit diagram illustrating a configuration of a rectifier circuit 5F according to a sixth modification. The rectifier circuit 5F of the present modification may be used as the rectifier circuit 5 of the above embodiment. The rectifier circuit 5F includes a first series circuit unit 43, a second series circuit unit 44, and a third series circuit unit 45. An intermediate point of the secondary winding 3b is connected to the reference potential line 9.

The first series circuit unit 43 is formed by alternately connecting N first capacitors Cp(2), Cp(4), ..., Cp(2N) and N second capacitors Cq(2), Cq(4), ..., Cq(2N) in series (N is an integer of 2 or more, and the case of N=3 is illustrated in the drawing). One end of the first series circuit unit 43 is connected to the reference potential line 9.

The second series circuit unit 44 is formed by connecting N capacitors Cp(1), Cp(3), ..., Cp(2N−1) in series. One end of the second series circuit unit 44 is connected to one end of the secondary winding 3b via a resistor R7.

The third series circuit unit 45 is formed by connecting N capacitors Cq(1), Cq(3), ..., Cq(2N−1) in series. One end of the third series circuit unit 45 is connected to the other end of the secondary winding 3b via a resistor R8.

Further, a cathode of a diode Dp(n) (here, n=1, 2, 3, . . . ) is connected to a high-voltage side electrode of the capacitor Cp(n), and an anode of the diode Dp(n) is connected to a low-voltage side electrode of the capacitor Cp(n+1). Further, the anode of the last stage diode Dp(2N) is connected to the high-voltage side electrode of the capacitor Cp(2N−1). Similarly, a cathode of a diode Dq(n) is connected to a high-voltage side electrode of the capacitor Cq(n), and an anode of the diode Dq(n) is connected to a low-voltage side electrode of the capacitor Cq(n+1). Further, the anode of the last stage diode Dq(2N) is connected to the high-voltage side electrode of the capacitor Cq(2N−1).

In this way, in the present modification, the capacitors Cp(1), Cp(3), ..., Cp(2N−1) of the second series circuit unit 44 and the first capacitors Cp(2), Cp(4), ..., Cp(2N) of the first series circuit unit 43 form a half-wave rectifier type CW circuit. Further, the capacitors Cq(1), Cq(3), ..., Cq(2N−1) of the third series circuit unit 45 and the second capacitors Cq(2), Cq(4), ..., Cq(2N) of the first series circuit unit 43 form another half-wave rectifier type CW circuit.

By using the above configuration, a potential at the other end of the first series circuit unit 43 is output as an output voltage of the rectifier circuit 5F.

In the rectifier circuit 5F of the present modification, the capacitors of an AC step-up portion (the second series circuit unit 44 and the third series circuit unit 45) of the half-wave rectifier type CW circuit are disposed symmetrically with respect to the capacitors of a DC portion (the first series circuit unit 43), and the secondary winding 3b of the transformer 3 has a center-tap structure. Due to this, ripple amplitudes generated in the capacitors of the AC step-up portion present at the same stage as counted from the transformer 3 are equal in principle. Therefore, it is possible to reduce superimposition of AC ripple on the DC portion. Therefore, according to this rectifier circuit 5F, it is possible to reduce ripple significantly.

Further, according to the rectifier circuit 5F of the present modification, it is possible to omit a low-pass filter circuit for reducing ripple or reduce the size significantly, and suppress an increase in the size of the entire circuit. Further, according to the rectifier circuit 5F of the present modification, since it is not necessary to provide a plurality of resistors on the path of the output current, it is possible to decrease power loss.

The present invention is not limited to the above embodiment and configuration examples, and various modifications can be made. For example, in the DC power supply circuit of the above-described embodiment, although the transistor 4 is controlled by the PWM signal, the on/off duty of the transistor 4 may be controlled by varying a pulse period while maintaining a constant pulse width.

The DC power supply circuit of the above embodiment is configured to include a voltage regulator circuit including a transistor provided in series in a power line, and an amplifier for receiving a control signal corresponding to a target voltage and controlling a voltage applied to a control terminal of the transistor according to the control signal; a transformer including a primary winding connected to the voltage regulator circuit; a switch element connected to the primary winding and for alternately repeating switching on and off of a current flowing through the primary winding; a rectifier circuit connected to a secondary winding of the transformer and for converting a voltage output from the secondary winding into a DC voltage; and a control circuit for controlling an on/off duty ratio of the switch element according to the target voltage.

Further, in the above DC power supply circuit, when the target voltage is included in a first voltage range, the control circuit sets the duty ratio to be constant, and the transistor operates in a linear region, and when the target voltage is included in a second voltage range higher than the first voltage range, the control circuit changes the duty ratio according to the target voltage, and the transistor operates in a saturation region.

In the above DC power supply circuit, when the target voltage is included in a third voltage range higher than the first voltage range and lower than the second voltage range, the control circuit may change the duty ratio according to the target voltage, and the transistor may operate in the linear region.

In this way, by providing the voltage range in which both the series regulator and the switching regulator control the magnitude of the output voltage between the first voltage range and the second voltage range, it is possible to smoothly switch the control between the series regulator and the switching regulator.

In the above DC power supply circuit, the rectifier circuit may be a capacitor-input type rectifier circuit. In this way, it is possible to convert the voltage output from the secondary winding into the DC voltage using a simple circuit configuration.

In the above DC power supply circuit, the rectifier circuit may be a voltage multiplier rectifier circuit formed by combining a plurality of diodes and a plurality of capacitors. In this way, it is possible to obtain a high voltage easily using a simple circuit configuration.

INDUSTRIAL APPLICABILITY

The present invention can be used as a DC power supply circuit capable of enhancing the stability of an output voltage while suppressing an increase in the size of a power supply device and an increase in the power loss.

REFERENCE SIGNS LIST

1—DC power supply circuit, 1a—power input terminal, 1b—power output terminal, 2—voltage regulator circuit, 2a—input terminal, 2b—output terminal, 2c—control input terminal, 3—transformer, 3a—primary winding, 3b—secondary winding, 4—transistor, 5—rectifier circuit, 5A—Cockcroft-Walton (CW) circuit, 6—PWM control circuit, 7—filter circuit, 8—error amplifier, 8a, 8b—input terminal, 8c—output terminal, 9—reference potential line, 11—capacitor, 12—control circuit, 13, 14—resistor, 20—power line, 21—transistor, 22—amplifier, 22a, 22b—input terminal, 22c—output terminal, 23, 24—resistor, Cd(1)-Cd(6)—capacitor, Dd(1)-Dd(6)—diode, N1-N4—node, Sc1—control signal, Sc2—PWM signal, VA—first voltage range, VB—second voltage range, VC—third voltage range, Vc1—control voltage, Vin—input voltage, Vout1, Vout2—output voltage.

The invention claimed is:

1. A DC power supply circuit comprising:
   a voltage regulator circuit including a transistor provided in series in a power line and an amplifier configured to receive a control signal corresponding to a target voltage, the amplifier controls a voltage applied to a control terminal of the transistor according to the control signal;
   a transformer including a primary winding directly connected in series to the voltage regulator circuit;
   a switch element connected to the primary winding and configured to alternately repeat switching on and off of a current flowing through the primary winding;
   a rectifier circuit connected to a secondary winding of the transformer and configured to convert a voltage output from the secondary winding into a DC voltage; and
   a control circuit configured to control an on/off duty ratio of the switch element according to the target voltage, wherein,
   when the target voltage is included in a first voltage range, the control circuit is configured to set the duty ratio to be constant, and the transistor is configured to operate in a linear region,
   when the target voltage is included in a second voltage range higher than the first voltage range, the control circuit is configured to change the duty ratio according to the target voltage, and the transistor is configured to operate in a saturation region, and
   wherein, when the target voltage is included in a third voltage range higher than the first voltage range and lower than the second voltage range, the control circuit is configured to change the duty ratio according to the target voltage, and the transistor is configured to operate in the linear region.

2. The DC power supply circuit according to claim 1, wherein the rectifier circuit is a capacitor-input type.

3. The DC power supply circuit according to claim 2, wherein the rectifier circuit is a voltage multiplier rectifier circuit formed by combining a plurality of diodes and a plurality of capacitors.

* * * * *